US008265851B2

(12) United States Patent
Girouard et al.

(10) Patent No.: US 8,265,851 B2
(45) Date of Patent: Sep. 11, 2012

(54) METHOD OF CONTROLLING ENGINE PERFORMANCE

(75) Inventors: Raymond Girouard, Atherton, CA (US); Robert J. Moffat, Los Altos, CA (US); Jacqueline R. Girouard, Atherton, CA (US)

(73) Assignee: Closed-Loop Engine Technology, LLC, Menlo Park, CA (US)

( * ) Notice: Subject to any disclaimer, the term of this patent is extended or adjusted under 35 U.S.C. 154(b) by 445 days.

(21) Appl. No.: 12/590,373

(22) Filed: Nov. 6, 2009

(65) Prior Publication Data

US 2010/0292906 A1 Nov. 18, 2010

Related U.S. Application Data

(60) Provisional application No. 61/216,527, filed on May 18, 2009.

(51) Int. Cl.
*G06F 19/00* (2011.01)
*F02C 9/00* (2006.01)

(52) U.S. Cl. .......... 701/99; 701/123; 123/429; 356/311; 73/23.31; 73/114.09; 73/112.01

(58) Field of Classification Search .................. 701/100
See application file for complete search history.

(56) References Cited

U.S. PATENT DOCUMENTS

| 5,186,146 | A | * | 2/1993 | Sohma et al. | ............ | 123/406.28 |
| 7,217,121 | B2 | * | 5/2007 | Thomson et al. | ............... | 431/12 |
| 7,619,742 | B2 | * | 11/2009 | Sanders | ........................ | 356/451 |
| 8,070,482 | B2 | * | 12/2011 | Fuentes et al. | .................. | 431/76 |
| 2002/0195086 | A1 | | 12/2002 | Beck et al. | | |
| 2004/0182359 | A1 | | 9/2004 | Stewart et al. | | |
| 2010/0028819 | A1 | * | 2/2010 | Knittel et al. | .................... | 431/76 |

FOREIGN PATENT DOCUMENTS

EP 0766080 A1 * 4/1997

OTHER PUBLICATIONS

Davidson et al. Development of an aerosol shock tube for kinetic studies of low-vapor-pressure fuels, (2008), vol. 155, 108-117, Combustion and Flame.

Reiker et al. Rapid measurements of temperature and H2O concentration in IC engines with a spark plug-mounted diode laser sensor, (2007), 3041-3049, vol. 31, Proceedings of the Combustion Institute.

(Continued)

*Primary Examiner* — Thomas Black
*Assistant Examiner* — Lin B Olsen
(74) *Attorney, Agent, or Firm* — Luman Patent Firm

(57) ABSTRACT

The present invention provides a method of controlling engine performance that includes obtaining at least one optical wavelength-dependent measurement from at least one combustion event in at least one combustion chamber. The method further includes analyzing the optical wavelength-dependent measurement for determining adjustments to the at least one combustion event. Additionally, the method includes adjusting the at least one combustion event or at least a next combustion event by changing at least one physical parameter, at least one constituent parameter, or at least one physical parameter and at least one constituent parameter to control the engine performance. The engine can include steady-flow engines or periodic flow engines, and the engine performance can be selected by an engine user.

23 Claims, 3 Drawing Sheets

OTHER PUBLICATIONS

Li et al. Sensing and Control of Combustion Instabilities in Swirl-Stabilized Combustors Using Diode-Laser Absorption, Feb. 2007, vol. 45, No. 2, AIAA Journal.

Rothhammer et al. Simultaneous imaging of exhaust gas residuals and temperature during HCCI combustion, (2009) 2869-2876, Proceedings of the Combustion Institute 32.

Lyle et al. Diode-Laser Sensor for Air-Mass Flux 1: Design and Wind-Tunnel Validation, Sep. 2007, 2204-2212, vol. 45, No. 9, AIAA Journal.

Rieker et al. A diode laser sensor for rapid, sensitive measurements of gas temperature and water vapour concentration at high temperatures and pressures, 1195-1204, 2007, vol. 18, Measurement Science and Technology.

Zhou et al. Development of a fast temperature sensor for combustion gases using a single tunable diode laser, 2005, 711-722, vol. 81, Applied Physics B.

Liu et al. Measurement of Nonuniform Temperature Distributions Using Line-of-Sight Absorption Spectroscopy, Feb. 2007, 411-419, vol. 45, No. 2, AIAA Journal.

Yoo et al. Detection of trace nitric oxide concentrations using 1-D laser-induced fluorescence imaging, (2008), 661-667, vol. 91, Applied Physics B.

Lee et al. Experimental evaluation of strategies for quantitative laser-induced-fluorescence imaging of nitric oxide in high-pressure flames (1-60 bar), (2007), 757-764, vol. 31, Proceedings of the Combustion Institute.

Klingbeil et al. Temperature- and composition-dependent mid-infrared absorption spectrum of gas-phase gasoline: Model and measurements, (2008), 3600-3609, vol. 87, Fuel.

Mattison et al. In-cylinder gas temperature and water concentration measurements in HCCI engines using a multiplexed-wavelength diode-laser system: Sensor development and initial demonstration, (2007), 791-798, vol. 311, Proceedings of the Combustion Institute.

Zhou et al. Wavelength-Scanned Tunable Diode Laser Temperature Measurements in a Model Gas Turbine Combustor, Feb. 2007, 420-425, vol. 45, No. 2,, AIAA Journal.

Liu et al. Development of a tunable diode laser sensor for measurements of gas turbine exhaust temperature, (2006), 469-478, vol. 82, Applied Physics B.

Klingbeil et al. Two-wavelength mid-IR absorption diagnostic for simultaneous measurement of temperature and hydrocarbon fuel concentration, (2009), vol. 32, 821-829, Proceedings of the Combustion Institute.

* cited by examiner

METHOD OF CONTROLLING ENGINE PERFORMANCE

CROSS-REFERENCE TO RELATED APPLICATIONS

This application is cross-referenced to and claims the benefit from U.S. Provisional Application 61/216,527 filed May 18, 2009, and which are hereby incorporated by reference.

FIELD OF THE INVENTION

The invention relates to managing engine and turbine performance. In particular, the invention relates to using optical wavelength-dependent measurements to monitor and adjust parameters in engine and turbine combustion events.

BACKGROUND

Poor engine performance affects engine durability, power, thermal efficiency and pollution. Recently, efforts have been directed to optimizing power and propulsion systems for cleaner and lower environmental impact power generation. One approach included an integrated engine combustion monitoring system that uses a light communication channel (LCC) and a sensor, which are embedded in a cylinder head gasket, for monitoring air and fuel mixture, and/or products of combustion, pressure, or temperature. Although this approach offers real-time in-situ data acquisition of some engine performance parameters, the approach requires manually refining operational variables to the engine after sufficient data is acquired. Another attempt included an optoelectronic measuring device for monitoring combustion processes in the combustion chamber of an internal combustion engine during operation using optical sensors. The sensors were aligned so that the individual viewing angles of the sensors uniformly cover at least one predefined measuring sector of the combustion chamber. Unfortunately, this device required a large optical system that uses reflection/deflection to communicate a limited number of performance parameters that are useful only for testing engine performance in a controlled lab setting.

Recently introduced performance chips are used to boost engine power. An engine control unit (ECU) uses a formula and a large number of lookup tables to determine the fuel flow for a given operating condition. A chip in the ECU holds all of the lookup tables. The tables in the performance chip contain values that result in higher fuel/air ratios during certain driving conditions. For instance, they may supply more fuel at full throttle at every engine speed, or change the spark timing, or both. Performance chips as recently configured are not used for monitoring vital aspects of engine performance such as engine durability, output power versus efficiency, thermal efficiency, acoustic output, or exhaust constituents, to name a few.

What is needed is a method of real-time, in-situ monitoring pre-combustion state, during the combustion event and post-combustion event in a cylinder and adjusting the combustion event or at least a next combustion event by changing physical parameters and/or constituent parameters to control the engine or turbine performance.

SUMMARY OF THE INVENTION

The present invention provides a method of controlling engine performance that includes obtaining at least one optical wavelength-dependent measurement from at least one combustion event in at least one combustion chamber. The method further includes analyzing the optical wavelength-dependent measurement for determining adjustments to the at least one combustion event. Additionally, the method includes adjusting the at least one combustion event or at least a next combustion event by changing at least one physical parameter, or at least one constituent parameter, or at least one physical parameter and at least one constituent parameter to control the engine performance.

According to one aspect of the invention, the combustion event can include a periodic event or a steady event.

In another aspect of the invention, the at least optical wavelength-dependent measurements are obtained using at least one optical sensor in the at least one combustion chamber and proximal to a region of the combustion event.

In a further aspect of the invention, the engine includes steady-flow engines or periodic-flow engines. Here, the steady-flow engines can be gas turbine engines, jet engines, or shaft power turbines. Further, the periodic-flow engines can be compression ignition engines spark ignition engines, laser ignition engines, pulse-jet engines, ram-jet engines, or scram-jet engines. According to this aspect, controlling the periodic-flow engine performance includes changing the combustion event physical parameters that include combustion chamber volume, instantaneous temperature level in a region proximal to a predetermined point, spatially averaged temperature level, temporal temperature level, averaged values of temperature level, temperature distribution within the combustion space, pressure, intake flow rate, exhaust flow rate, ignition timing, ignition energy per event, ignition energy delivery location and combustion duration. Also, according to the current aspect, controlling the steady-flow engine performance includes changing at least one the combustion process physical parameters that includes instantaneous temperature level, spatially distributed temperature level, temperature distribution within the combustion space, fuel flow rate, fuel composition, fuel temperature, ignition characteristics and combustion duration, wherein said ignition characteristics comprise timing, ignition energy, ignition energy delivery location or combustion duration. In this aspect, the periodic flow engine performance combustion event constituent parameters are measured during an event phase such as pre-combustion phase, combustion phase or end-stage combustion phase. Further, the periodic flow engine control is achieved using at least one actuator altering at least one combustion parameter such as composition of the total intake charge, pre-combustion fuel vapor or spray concentration and distribution, pre-combustion water vapor concentration, combustion chamber volume, ignition parameters (timing of initiation, duration of energy delivery, temporal profile of energy delivery, timing of the end of energy delivery), inlet charge temperature, intake valve operating parameters (opening event, duration, valve lift or equivalent, and closing event), exhaust valve operating parameters (opening event, duration, valve lift or equivalent, and closing event), fuel composition and fuel temperature. Here, portions of the total intake charge can include air, exhaust products, water droplets, water vapor or fuel additives. According to the current aspect, controlling the steady-flow engine performance includes least one actuator altering at least one combustion parameter such as air flow rate, various cooling air flow rates, secondary air flow rate, air temperature, air pressure, turbine tip clearance, fuel concentration distribution in space and time, water vapor concentration distribution in space and time, ignition timing, ignition energy delivery rate, energy delivery duration, fuel composition or fuel temperature.

According to another aspect, the engine performance can include engine durability, output power, thermal efficiency, acoustic output, or exhaust constituents, where the hierarchy of engine performance can be selected by an engine user.

In another aspect of the invention, the controller adjusts at least one the combustion parameter during the combustion events upon receiving the at least optical wavelength-dependent measurements.

According to another aspect of the invention, when the engine is a steady flow engine, engine durability is enhanced by adjusting a fraction of inlet air flow used for primary zone combustion, secondary air combustion and liner cooling in the response to commands from an engine control unit.

In another aspect of the invention, the engine performance is enhanced by altering fuel composition in response to commands from an engine control unit by injection of additives that can include of a knock suppressor in a spark ignition engine, a NOx suppressor, or a soot suppressor engine upon detection of an incipient condition, wherein the soot suppressor is used in a diesel or a gas turbine.

In another aspect of the invention, the engine is a steady flow engine having a steady-flow event, where at least one actuator alters at least one of the combustion parameters such as fuel concentration, oxygen concentration, air flow, combustion chamber pressure, combustion chamber temperature, fuel temperature or fuel composition.

In a further aspect, the engine is a periodic engine having at least one periodic event, where at least one actuator alters at least one of the combustion parameters such as fuel concentration, oxygen concentration, combustion chamber pressure, combustion chamber temperature, ignition timing, ignition duration, intake valve timing, exhaust valve timing, intake valve duration, exhaust valve duration, fuel temperature or fuel composition.

In another aspect of the invention, a position indicating device is coupled to an engine control unit to facilitate compliance with all territorial or zonal requirements, where the position indicating device comprises a global positioning system.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The current invention provides an expert system for monitoring and optimizing engine performance. Specifically, the invention provides a method of monitoring a combustion event in a combustion chamber of an engine and, in real-time, altering the physical parameters and/or altering the constituent parameters in the combustion events using a high-speed controller to control the actuators, which can include high-speed actuators. The term combustion event includes a periodic event in periodic flow engines or a steady event in steady-flow engines. Here, the periodic flow engines can be compression ignition engines spark ignition engines, laser ignition engines, pulse-jet engines, ram jet engines, or scram jet engines, and the steady-flow engines can be gas turbine engines, jet engines, or shaft power turbines.

An actuator alters at least one of the combustion parameters such as fuel concentration, oxygen concentration, combustion chamber volume, combustion chamber pressure, combustion chamber temperature, ignition timing, ignition duration, intake valve timing, exhaust valve timing, intake valve duration, exhaust valve duration, or fuel temperature. The controller adjusts at least one combustion parameter during the combustion events, or at least one before the next event in periodic-flow engines upon receiving the commands from the ECTU, based on all of the inputs including optical wavelength-dependent measurements.

Figure 1:
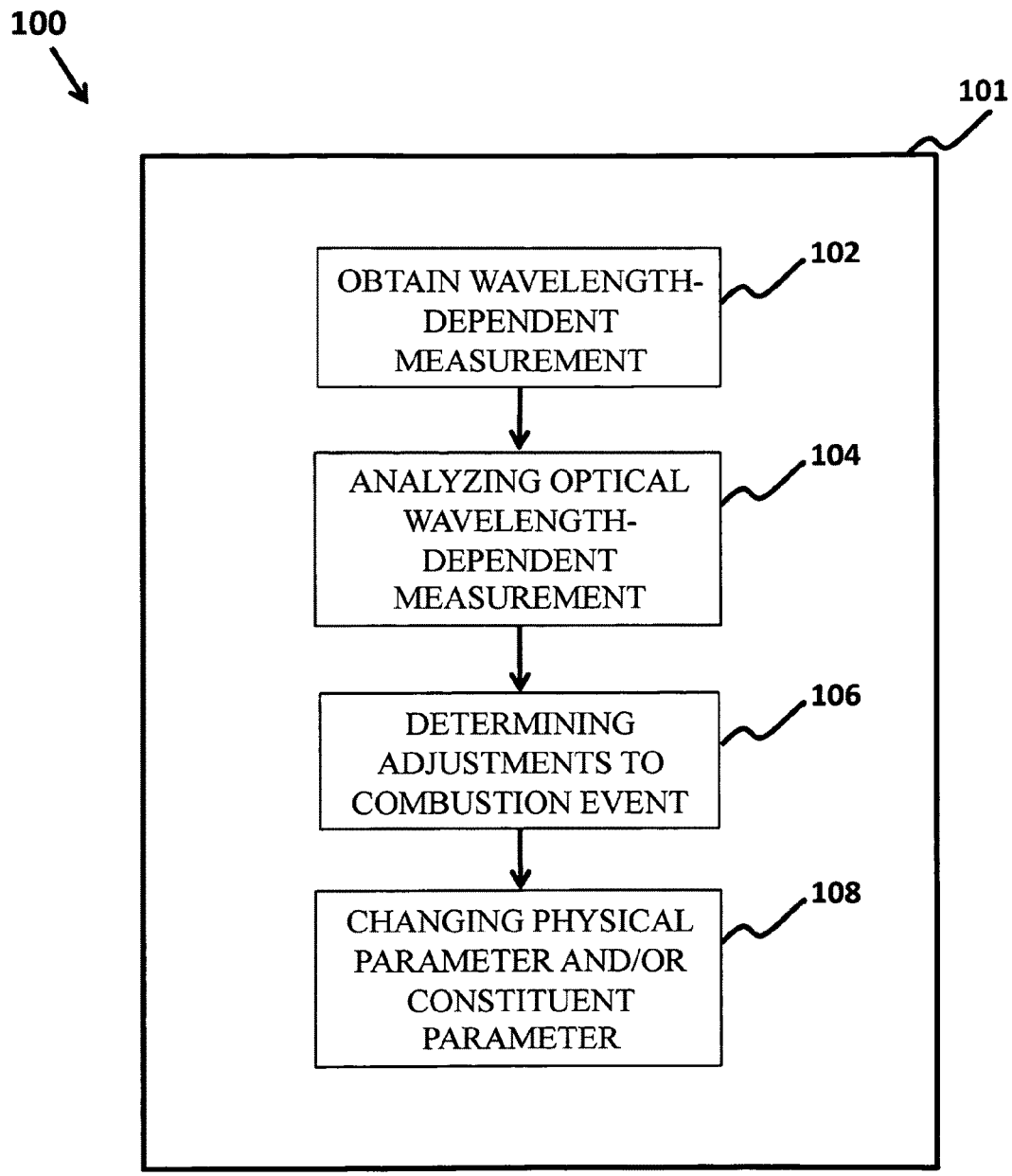
FIG. 1 shows a schematic flow diagram of the method of controlling engine performance according to the present invention.

Referring to the figures, FIG. 1 shows a flow diagram of the method of controlling engine performance 100 according to the present invention. The flow diagram 100 shows an engine 101 where at least one optical wavelength-dependent measurement is obtained 102, where the measurement can include any sophisticated optical measurement, for example line-of-sight absorption spectroscopy, wavelength modulation spectroscopy applied, planar laser-induced fluorescence (PLIF), wavelength-multiplexed, fiber-optic-based, line-of-sight, diode-laser absorption, multi-spectral detection, wavelength modulation spectroscopy using at least one tunable diode-laser sensor, the ratio of measured absorbances of two water vapor overtone transitions in the near infrared using a tunable diode laser, a scanned wavelength technique with wavelength modulation and $2f$ detection using at least one diode laser, density inferred from spectroscopic absorption by an oxygen feature, velocity obtained from a Doppler frequency shift between absorption features from two crossed paths, two tunable diode laser temperature sensors comprising a first sensor using direct absorption and a second sensor using wavelength-modulation spectroscopy with second-harmonic detection, spectrally resolved laser-induced fluorescence (LIF), a diode laser absorption sensor inferring temperature from a ratio of optical absorption for two overtone transitions and $H_2O$ concentration determined from inferred temperature and absorption for one of the transitions, time-resolved absorption-based measurements of temperature and fuel vapor concentration using a two-wavelength mid-IR laser and a difference-frequency-generation laser. Further shown in FIG. 1 the method includes analyzing the optical wavelength-dependent measurement 104 and, in combination with other inputs, determining adjustments to the combustion event 106. Additionally, the method includes adjusting the combustion event 108 or at least a next combustion event by changing at least one physical parameter or, at least one constituent parameter, or at least one physical parameter and at least one constituent parameter to optimize the selected engine performance parameters according to the relative importance of engine durability, output power, thermal efficiency, acoustic output, or exhaust constituents. Here, the engine performance can be selected by an engine user, where the engine user is able to select which performance parameter is to be optimized depending upon the operator's needs at the time. For example, a pilot on take off or climb out would optimize for power. A VLCC engineer with 3,000 nautical miles remaining to reach port may optimize for fuel efficiency but opt to minimize emissions when nearing port. A freight vehicle may select for maximum emissions control when operating in a high-density urban environment, to name a few.

Figure 2:
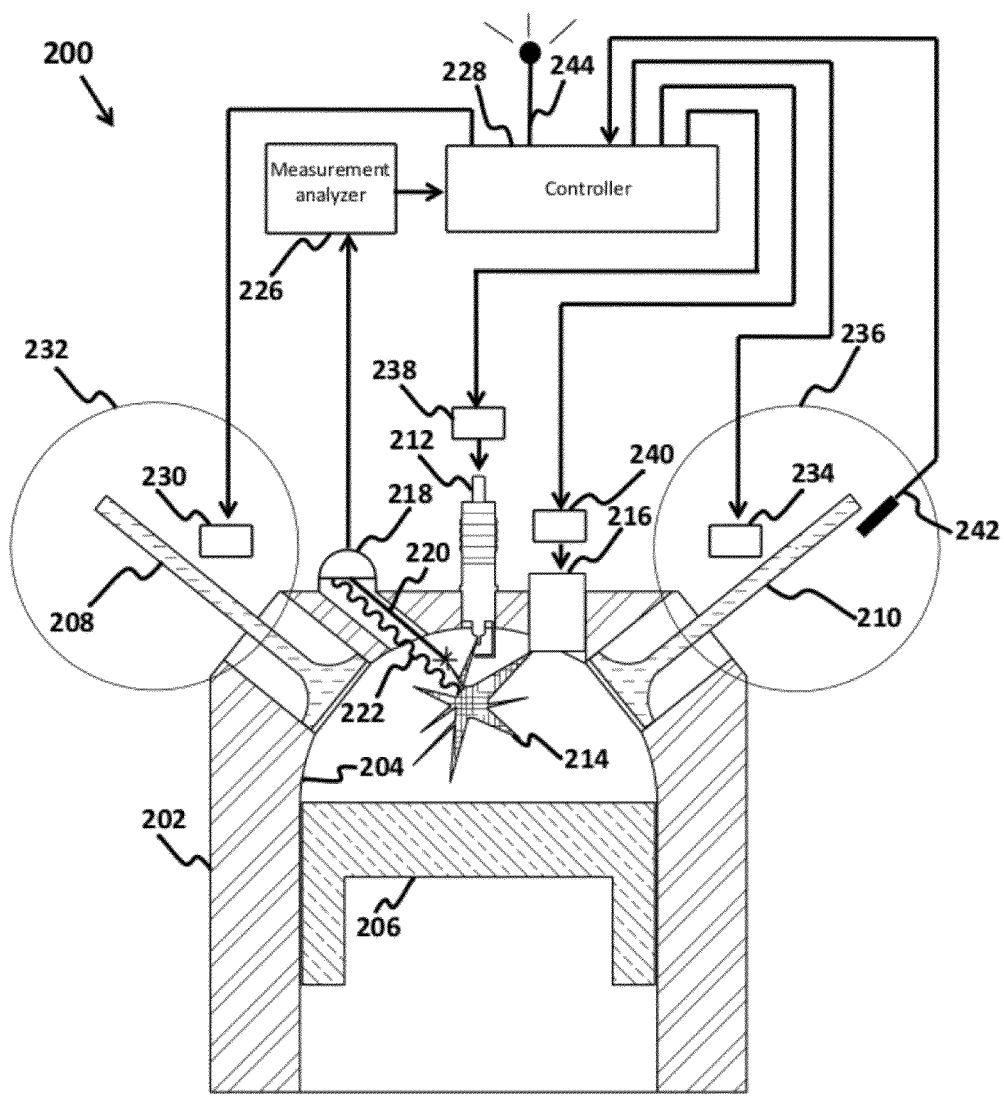
FIG. 2 shows a drawing of the expert system for monitoring and optimizing engine performance of a periodic-flow engine according to the current invention.

FIG. 2 shows a drawing of the expert system for monitoring and optimizing engine performance of a periodic-flow engine 200 according to the current invention. Shown in FIG. 2 is an engine block 202 with a combustion chamber and a piston 206. Further shown is an intake valve 208 and an exhaust valve 210, a spark plug 212 for providing a spark to ignite a combustion event 214, where it is understood that other engine types, such as diesel engines, do not require a spark plug 212 to initiate a combustion event 214. The current embodiment shown in FIG. 2 includes a combustion chamber volume displacement device 216 and an optical sensor 218, where in this example the optical sensor 218 is proximal to a region of the combustion event 214 and may include a light source 220 such as a laser for facilitating optical measurement of wavelength-dependent information 222 from a combustion event 214. In FIG. 2 the sensor 218 measures combustion event constituent parameters in an event phase such as pre-combustion phase, combustion phase or end-stage combustion phase, and the measurement is received by a measurement analyzer 226 that may function in real-time. The analyzer sends the results to a controller 228 for determining what modifications, if any, need to be made to the combustion event 214. If the controller 228 determines changes to the combustion event 214 are needed, a signal is provided to an actuator to change at least one physical parameter and/or at least one constituent parameter relating to the present or subsequent combustion event 214. For example, the controller 228 can operate an intake actuator 230 to provide real-time adjustment of an intake parameter 232, where FIG. 2 shows the intake parameter 232 as a generic circle to represent any one of the intake parameters that can include, total intake charge per intake event (or flow rate for steady flow), pre-combustion fuel vapor or spray concentration and distribution, pre-combustion water vapor concentration, intake temperature, fuel temperature, intake valve operating parameters such as opening event, duration, valve lift or equivalent, and closing event. Here, the total intake charge can include air, exhaust products, water droplets or water vapor.

FIG. 2 further shows the controller 228 can operate an exhaust actuator 234 to provide real-time adjustment to an exhaust parameter 236, where FIG. 2 again shows a generic circle to represent any one of the exhaust parameters that can include exhaust valve operating parameters such as opening event, duration, valve lift or equivalent, and closing event, regeneration of the exhaust heat to improve the combustion event 214, recirculation of exhaust constituents to the combustion event 214, According to the current embodiment, the controller 228 can operate a sparkplug actuator 238 to operate on the spark plug 212 (the spark plug represents any other ignition generator) and provide real-time adjustment to the ignition parameter that can include timing of initiation, duration of energy delivery, temporal profile of energy delivery, timing of the end of energy delivery.

The controller 228 can further operate a combustion chamber volume actuator 240 to operate on the combustion chamber volume displacement 216 and provide real-time adjustment to the volume of the combustion chamber 204 between compression events.

The controller 228 can operate any or all of the actuators to alter combustion parameters such as fuel concentration, oxygen concentration, combustion chamber volume, combustion chamber pressure, combustion chamber temperature, ignition timing, ignition duration, intake valve timing, exhaust valve timing, intake valve duration, exhaust valve duration, or fuel temperature.

In another aspect of the invention, fuel additives are used to modify the exhaust emissions, where a probe 242 is disposed in the exhaust stream with the sensor input fed to the controller 228 enabling corrective action to be taken in real time. In one aspect, an environmental control agency for a jurisdiction whose territory the vessel/aircraft/truck is entering, a down-loadable file is provided using a positioning indicating device 244, such as a global positioning system (GPS), is captured and reviewed for compliance showing the data stream from the exhaust. The environmental control agency provides a time and location stamp and identifies any out of compliance events. Here, the down-loadable file has limited write/erase access to the file so that it couldn't be modified.

FIG. 2 shows the controlling of a periodic flow engine performance by changing the combustion event physical parameters such as inlet charge temperature by blending air at a controlled temperature with the intake charge using a fast-acting valved injector. Alternatively, the fuel to air ratio could be changed from combustion event to combustion event by changing the fuel injector parameter.

In a further aspect of the invention, the engine performance is enhanced by altering fuel composition in response to commands from an engine control unit by injection of additives such as injecting of a knock suppressor in a spark ignition engine or a soot suppressor in a diesel of gas turbine engine upon detection of an incipient condition.

According to the invention, the engine can include steady-flow engines or periodic flow engines, where the steady-flow engines can be gas turbine engines, jet engines, or shaft power turbines, and the periodic flow engines can be compression ignition engines spark ignition engines, laser ignition engines, pulse-jet engines, ram jet engines, or scram jet engines.

Figure 3:
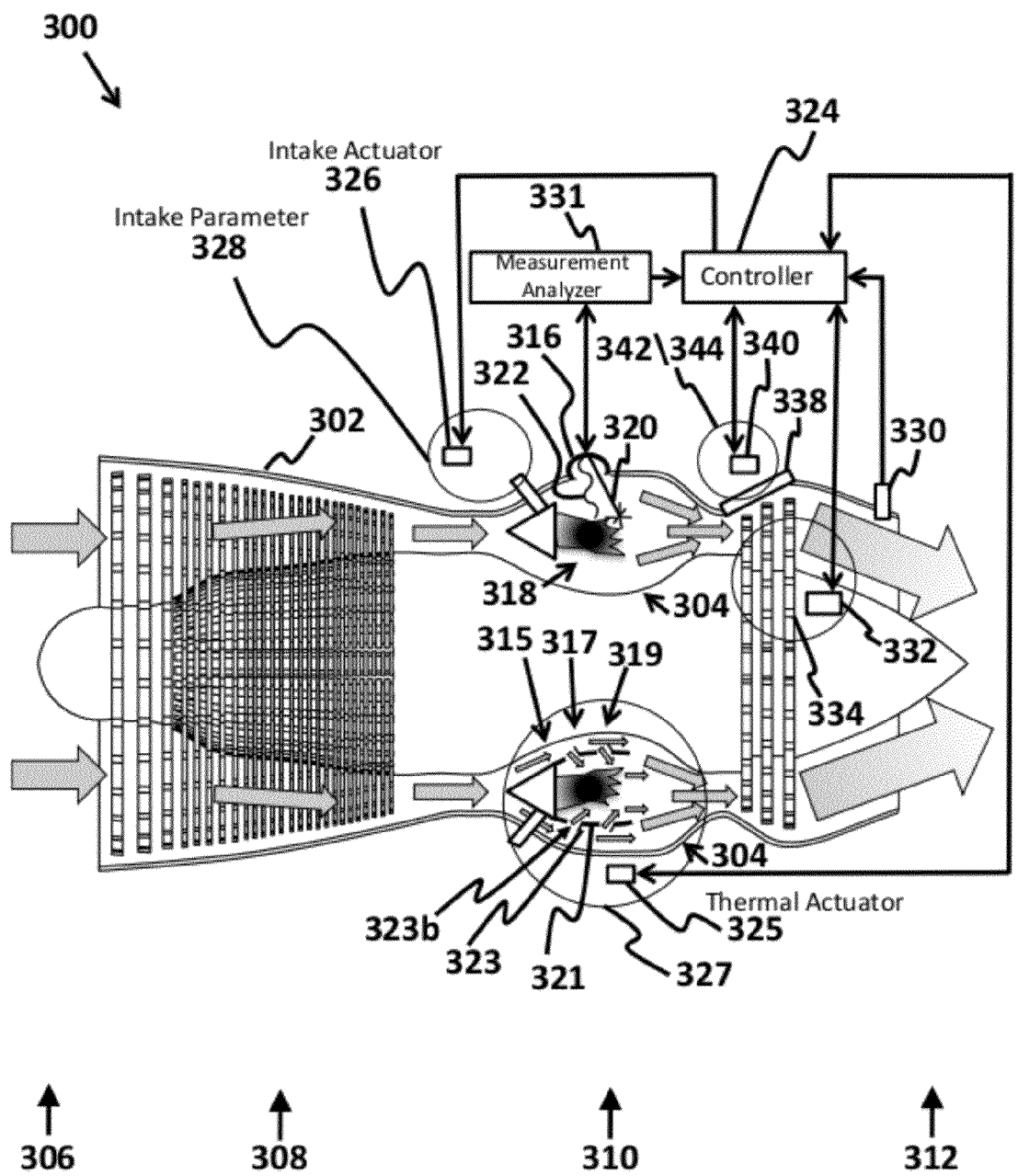
FIG. 3 shows a drawing of the expert system for monitoring and optimizing engine performance of a steady-flow engine according to the current invention.

FIG. 3 shows a drawing of the expert system for monitoring and optimizing engine performance of a steady-flow engine 300 according to the current invention. Shown in FIG. 3 is a steady-flow engine housing 302 with a combustion chamber 304, where the top chamber 304 is shown with some of the monitoring and control elements and the bottom chamber 304 is shown with other monitoring and control elements to simplify the drawing, and it is understood that one or more combustion chambers 304 can include all of the monitoring and control elements discussed here. Shown is an air intake region 306, a compression region 308, a combustion region 310 having the combustion chambers 304 and an exhaust region 312. The current embodiment shown in the top combustion chamber 304 includes an optical sensor 316, where in this example the optical sensor 316 is proximal to a region of the combustion process 318 and includes a light source 320, such as a laser, for facilitating the measurement of the wavelength-dependent information 322 from the combustion process 318. In FIG. 3, the optical sensors 316 measure combustion process constituent parameters in the pre-combustion region 315, the primary combustion region 317 and the secondary combustion region 319 as shown in the lower combustion chamber 304, where the measurements are received by a measurement analyzer 331 which may function in real-time. The analyzer sends the results to a controller 324 for determining what modifications if any, need to be made to the combustion event 318. If the controller 324 determines changes to the combustion process 318 are needed, a signal, which may be real-time or suitably averaged is provided to an actuator to change at least one physical parameter and/or at least one constituent parameter relating to the combustion process 318. For example, the controller 324 can operate a fuel intake actuator 326 to provide real-time adjustment of a fuel intake parameter 328, where FIG. 3 shows the fuel intake parameter 328 as a generic circle to represent any one of the fuel intake parameters that can include for example, instantaneous fuel flow rate, pre-combustion fuel vapor or spray concentration and distribution, pre-combustion water vapor concentration, or fuel temperature.

As shown, a sensor 330 is disposed in the exhaust stream 312 to provide exhaust data to the controller 324, where the controller 324 adjusts at least one actuator altering at least one combustion parameter that can include primary air flow rate, secondary air flow rate, air temperature, fuel concentration distribution in space and time, water vapor concentration distribution in space and time, ignition timing, ignition energy delivery rate, energy delivery duration, fuel composition and fuel temperature. FIG. 3 further shows the lower combustion chamber 304 having the combustion chamber lining 321 having operable valves 323 to open and close ports 323b in the secondary combustion region 319 of combustion chamber lining 321 to control the combustion event 318 cooling. The ports 323b may be smaller near the front of the flow and become progressively larger down stream, and are operated by the combustion chamber thermal actuator 325 as instructed by the controller 324. The combustion chamber 304 further includes one or more thermal monitoring elements 327 for monitoring the temperatures of the combustion chamber lining 321, the combustion event 318 and the air temperatures inside and outside of the combustion chamber lining 321. Here a generic circle represents the monitoring elements for determining the total flow parameters in the combustion region 310. The thermal monitoring elements can be a pyrometer, thermocouples or other such sensors.

FIG. 3 further shows the controller 324 disposed to operate a vane-adjust actuator 332 to adjust the angle of the turbine blades 334 in response to signals from the controller 324. Turbine efficiency can be maintained at an optimum value if the angle of the turbine blades 334 with respect to the combustion flow parameter can be adjusted as the load point changes.

Another factor that affects efficiency in a steady-flow engine 300 is the clearance between the tips of the turbine blades 334 and the shroud 338 surrounding the turbine 334. Leakage across the tips of the blades 334 represents a loss that must be minimized. According to the current invention, the clearance between the tips of the turbine blades 334 and the shroud 338 can be adjusted by a shroud actuator 340 that moves a moveable shroud 338 to change the clearance between the tips of the turbine blades 334 and the turbine shroud 338. The invention further includes an inductive, capacitive or acoustic detector 342, to determine when the blades 334 approach or touch the shroud 338. According to another aspect of the invention the clearance between the tips of the turbine blades 334 and the turbine shroud 338 are altered by adjusting the temperature and/or the flow rate of the cooling airflow between the shroud 338 and the tips of the turbine blades 334. Such temperature adjustment is done by the controller 324, where the temperature of the shroud 338 is measured by a shroud temperature sensor 344.

According to the current invention, controlling the steady-flow engine performance includes changing at least one of the combustion process physical parameters such as time-averaged cooling air temperature level and/or temperature distribution cooling air flow rate and ignitor performance (energy delivered or location) controlling the steady-flow engine performance requires at least one actuator altering at least one combustion parameter such as an air flow rate (primary, secondary or cooling), the fuel concentration distribution in space and time, water vapor concentration distribution in space and time, ignition timing, ignition energy delivery rate, energy delivery duration, fuel composition and fuel temperature.

According to the current aspect, controlling the steady-flow engine performance includes least one actuator altering at least one combustion parameter such as primary or secondary or cooling air flow rate, fuel concentration distribution in space and time, water vapor concentration distribution in space and time, ignition characteristics that include ignition energy delivery rate and energy delivery duration, fuel composition and fuel temperature.

According to another aspect of the invention, when the engine is a steady flow engine, engine durability is enhanced by adjusting a fraction of inlet air flow used for primary zone combustion, secondary air combustion and liner cooling in the response to commands from an engine control unit.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art.

All such variations are considered to be within the scope and spirit of the present invention as defined by the following claims and their legal equivalents.

What is claimed is:

1. A method of controlling engine performance comprising:
    a. obtaining at least one optical wavelength-dependent measurement from at least one combustion event in at least one combustion chamber of an engine;
    b. analyzing said at least one optical wavelength-dependent measurement for determining adjustments to said at least one combustion event; and
    c. adjusting said at least one combustion event or at least a next combustion event by changing at least one physical parameter, at least one constituent parameter, or at least one physical parameter and at least one constituent parameter to control said engine performance.

2. The method of controlling engine performance of claim 1, wherein said combustion event is selected from the group consisting of a periodic event and a steady event.

3. The method of controlling engine performance of claim 1, wherein said at least one optical wavelength-dependent measurements are obtained using at least one optical sensor in said at least one combustion chamber and proximal to a region of said combustion event.

4. The method of controlling engine performance of claim 1, wherein said engine comprises steady-flow engines or periodic flow engines.

5. The method of controlling engine performance of claim 4, wherein said steady-flow engines are selected from the group consisting of gas turbine engines, jet engines, and shaft power turbines.

6. The method of controlling engine performance of claim 4, wherein said periodic flow engines are selected from the group consisting of compression ignition engines, spark ignition engines, laser ignition engines, pulse-jet engines, ram-jet engines, and scram-jet engines.

7. The method of controlling engine performance of claim 4, wherein controlling performance of said periodic flow engine comprises changing said at least one physical parameter of said at least one combustion event, wherein said at least one physical parameter is selected from the group consisting of combustion chamber volume, instantaneous temperature level in a region proximal to a predetermined point, spatially averaged temperature level, temporal temperature level, averaged values of temperature level, temperature distribution within the combustion space, pressure, intake flow rate, exhaust flow rate, ignition timing, ignition energy per event, ignition energy delivery location and combustion duration.

8. The method of controlling engine performance of claim 4, wherein controlling performance of said steady-flow engine comprises changing said at least one physical parameter of said at least one combustion event, wherein said at least one physical parameter is selected from the group consisting of instantaneous temperature level, spatially distributed temperature level, temperature distribution within the combustion space, fuel flow rate, fuel composition, fuel temperature, ignition characteristics and combustion duration, wherein said ignition characteristics comprise timing, ignition energy, ignition energy delivery location and combustion duration.

9. The method of controlling engine performance of claim 4, wherein said at least one constituent parameter in said at least one combustion event of said periodic flow engine is measured during an event phase selected from the group consisting of pre-combustion phase, combustion phase and end-stage combustion phase.

10. The method of controlling engine performance of claim 4, wherein said periodic flow engine control is achieved using at least one actuator altering at least one constituent and/or physical parameter selected from the group consisting of composition of the total intake charge, pre-combustion fuel vapor or spray concentration and distribution, pre-combustion water vapor concentration, combustion chamber volume, ignition parameters, inlet charge temperature, intake valve operating parameters, exhaust valve operating parameters, and fuel composition and fuel temperature.

11. The method of controlling engine performance of claim 10, wherein said ignition parameters are selected from the group consisting of timing of initiation, duration of energy delivery, temporal profile of energy delivery, and timing of an end of energy delivery.

12. The method of controlling engine performance of claim 10, wherein said intake valve operating parameters are selected from the group consisting of opening event, duration, valve lift or equivalent, and closing event.

13. The method of controlling engine performance of claim 10, wherein said exhaust valve operating parameters are selected from the group consisting of opening event, duration, valve lift or equivalent, and closing event.

14. The method of controlling engine performance of claim 10, wherein a portion of said total intake charge whose composition is to be evaluated is selected from the group consisting of air, exhaust products, water droplets and water vapor and fuel additives.

15. The method of controlling engine performance of claim 4, wherein controlling said steady-flow engine performance comprises at least one actuator altering at least one constituent and/or physical parameter selected from the group consisting of primary air flow rate, secondary air flow rate, cooling air flow rates, air temperature, turbine tip clearance, fuel concentration distribution in space and time, water vapor concentration distribution in space and time, ignition timing, ignition energy delivery rate, energy delivery duration, fuel composition and fuel temperature.

16. The method of controlling engine performance of claim 1, wherein a measure of engine performance is selected from the group consisting of engine durability, output power, thermal efficiency, acoustic output, and exhaust constituents.

17. The method of controlling engine performance of claim 16, wherein said measure of engine performance is selected by an engine user.

18. The method of controlling engine performance of claim 1, wherein a controller adjusts at least one said constituent and/or physical parameter during said combustion events upon receiving said at least one optical wavelength-dependent measurements.

19. The method of controlling engine performance of claim 1, wherein said engine is a steady flow engine, wherein engine durability is enhanced by adjusting a fraction of inlet air flow used for primary zone combustion, secondary air combustion and liner cooling in the response to commands from an engine control unit.

20. The method of controlling engine performance of claim 1, wherein said engine performance is enhanced by altering fuel composition in response to commands from an engine control unit by injection of additives selected from the group consisting of a knock suppressor in a spark ignition engine, a NOx suppressor, and a soot suppressor engine upon detection of an incipient condition, wherein said soot suppressor is used in a diesel or a gas turbine.

21. The method of controlling engine performance of claim 1, wherein said engine comprises a steady-flow engine, wherein said steady-flow engine comprises a steady-flow event, wherein at least one actuator alters at least one of said constituent and/or physical parameters selected from the group consisting of fuel concentration, oxygen concentration, air flow, combustion chamber temperature, fuel temperature and fuel composition.

22. The method of controlling engine performance of claim 1, wherein said engine comprises a periodic engine, wherein said periodic engine comprises at least one periodic event, wherein at least one actuator alters at least one of said constituent and/or physical parameters selected from the group consisting of fuel concentration, oxygen concentration, combustion chamber pressure, combustion chamber temperature, ignition timing, ignition duration, intake valve timing, exhaust valve timing, intake valve duration, exhaust valve duration, fuel temperature and fuel composition.

23. The method of claim 1, wherein a position indicating device is coupled to an engine control unit to facilitate compliance with territorial or zonal requirements, wherein said position indicating device comprises a global positioning system.

* * * * *